Nov. 18, 1969   A. HEIMLER   3,478,538
UNIVERSAL JOINT
Filed March 28, 1968   2 Sheets-Sheet 1
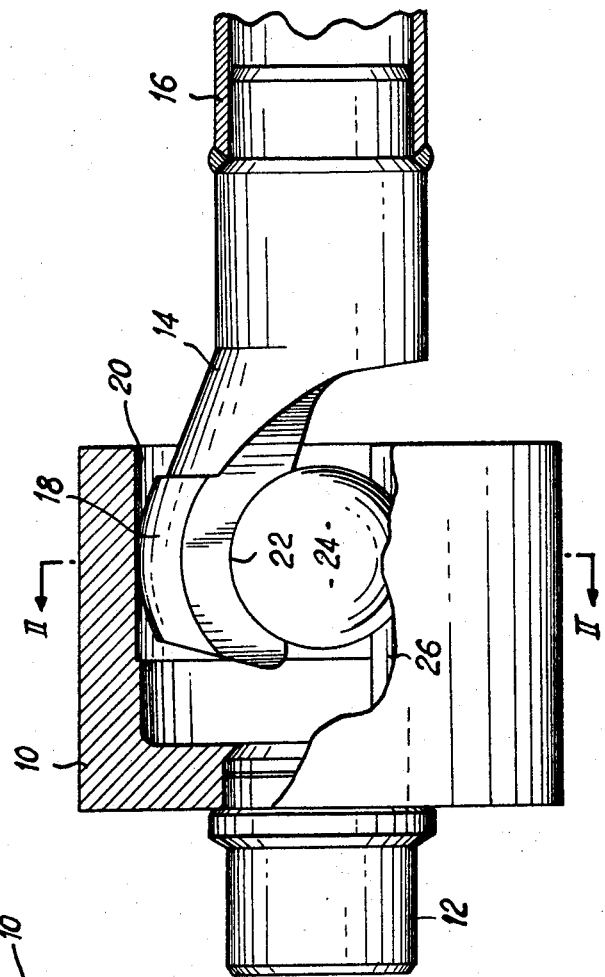
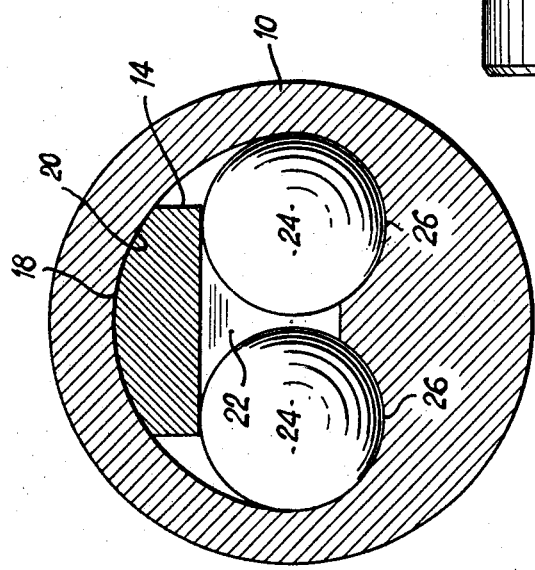

United States Patent Office 3,478,538
Patented Nov. 18, 1969

3,478,538
UNIVERSAL JOINT
André Heimler, Montreuil, France, assignor to
Societe Anonyme D.B.A.
Filed Mar. 28, 1968, Ser. No. 716,766
Claims priority, application France, Apr. 4, 1967,
101,407
Int. Cl. F16d 3/22
U.S. Cl. 64—7                                      8 Claims

ABSTRACT OF THE DISCLOSURE

A universal joint in which the torque is transmitted between an inner member and an outer member by balls located in rectilinear grooves extending axially in the internal wall of the outer member, wherein the inner member comprises a part spherical convex surface cooperating with a portion of internal surface of the outer member which is substantially cylindrical and further comprises a cylindrical concave surface having its axis perpendicular to the axis of the joint in aligned condition which cooperates with two balls diametrally opposed and located in grooves extending symmetrically with respect to the axial plane of symmetry of said portion of internal surface.

SUMMARY OF THE INVENTION

Prior art U-joints of the drum type in which the torque is transmitted between an inner member and an outer member by balls located in rectilinear grooves extending axially in the internal wall of the outer member are generally of a complex structure since it is desired they be homokinetic.

The universal joint of the invention can only be considered as substantially homokinetic for small bending angles generally less than ten degrees but it can be favorably compared with joints of the Cardan type with respect to which it presents the advantage of permitting a certain axial sliding motion.

The joint of the invention also provides other advantages notably with respect to its simplicity, its reduced number of parts and its easy machining.

The outer member may be manufactured by an extrusion process, and because of the large diameter of the balls, the treatment of the internal surfaces, may consist of a mere medium frequency treatment easily executed by means of inductors moved parallel to the axis of said member.

The machining of the inner member is also very easy; the cylindrical grooves may be machined simultaneously on a plurality of inner members aligned side by side with their axes parallel to each other.

The joint of the invention will be of a great interest for transmitting high torques in the case of transmission shafts working with small bending angle.

BRIEF DESCRIPTION OF THE DRAWINGS

FIGURE 1 is a front view with parts broken away of a joint according to the invention;
FIGURE 2 is a cross-sectional view of the joint along line II—II of FIGURE 1.

DETAILED DESCRIPTION

Figure 3:
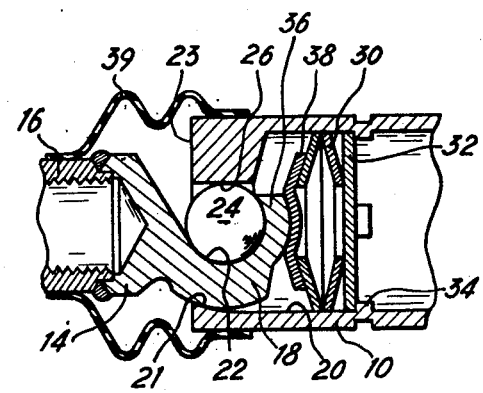
FIGURES 3 and 4 are longitudinal cross-sectional views of U-joints according to the invention of the no-lash type.

As seen in FIGURES 1 and 2, the joint of the invention comprises an outer member 10 having the shape of a drum or tubing portion which is integral with a shaft 12 and an inner member 14 internally disposed in outer member 10 and integral with a transmission shaft 16.

The head of the inner member 14 is provided with a spherical convex outer surface 18 cooperating with a cylindrical wall portion 20 of the outer member 10. The centre of curvature of the spherical surface 18 is located substantially on the axis of the joint in aligned condition. The head of the inner member 14 comprises a cylindrical concave surface 22 the axis of which is at right angle with respect to the axis of the joint in aligned condition or, more precisely, perpendicular to the plane of longitudinal symmetry of the portion 20 of cylindrical surface with which the spherical surface 18 of the inner head cooperates.

As shown in the drawing, between the inner member 14 and the outer member 10 are located two balls 24 the radius of which is substantially equal to the one of the groove forming cylindrical surface 22. Balls 24 are located in grooves 26 extending parallel to the axis of the joint in aligned condition, symmetrically with respect to the plane of symmetry of the cylindrical portion 20.

With a view to transmitting a maximal torque for a given hardness of the balls 24 and grooves 22 and 26, there has been chosen the maximal radius possible for said balls, which, as a matter of fact, is substantially equal to half the radius of the cylindrical portion 20.

The operation of the joint described above is easily understood by the one skilled in the art. It is in fact obvious that when the joint is bent with the axes of the members 10 and 14 maintained in the plane of FIGURE 1, the bending of the joint will occur about the axis joining the centres of the balls 24, said balls remaining steady in their respective grooves 26. Contrarily, when the bending of the joint is made out of the plane of FIGURE 1, the balls 24 will move in their respective grooves 26, the spherical surface 18 of member 14 being maintained in contact with the cylindrical surface 20 of the outer member 10.

Of course, the joint will operate normally even for slight axial displacements of the shafts 12 and 16 so long as the point of contact of the spherical surface 18 will be kept on the cylindrical portion 20 of member 10, with the balls 24 remaining in their respective groove.

According to a secondary feature of the invention, the portion of cylindrical surface on which bears the spherical surface of the inner element is replaced by a surface which is slightly frusto-conical and tapered toward the exterior. With such a feature, it may be understood that when urging the inner element toward the interior of the outer element, it is possible to eliminate the play. This may be of interest when the joint is to be mounted in a steering column. In such a column there will be preferably used two joints according to the invention on which will be exerted compression forces.

Figure 4:
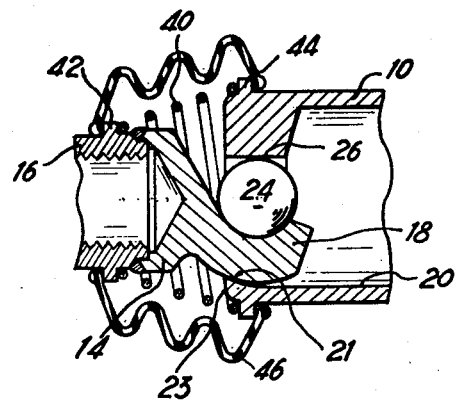

In FIGURES 3 and 4 are shown two embodiments of the invention according to which the joint is similar to the one of FIGURES 1 and 2 but is provided with a conical or part-spherical surface cooperating with the inner element and resilient means are located between the inner and outer elements to urge said inner element against said conical or part-spherical surface to prevent back-lash.

Same reference numerals have been used in FIGURES 3 and 4 to designate parts already described with reference to FIGURES 1 and 2.

When considering more especially FIGURE 3, the spherical surface 18 of inner member 14 cooperates with the internal surface 20 of the outer member 10 which is conical or spherical, at least at 21 near the end face 23 of the outer member 10.

The slope, in the case of a conical surface 21, or the radius, in the case of a spherical surface 21, is such that said surface 21 is flared toward the interior of the joint.

According to the embodiment of FIGURE 3, the aforesaid resilient means provided between the outer member 10 and the inner member 14 comprises a stack 30 of Belleville washers or the like engaging on the one hand, a flat washer in abutment against radial projections 34 of the inner wall of the tubular outer member and on the other hand, a spherical axially protruding portion 36 of the inner member 14 through the intermediary of a cup-shaped bearing washer 38. A rubber boot 39 is connected to both members as shown.

The mounting of the joint of FIGURE 3 comprises the steps of introducing the inner member 14 into the outer member 10, inserting the balls from the outside of the joint, setting in place the resilient means and maintaining the latter by punching projections 34 by means of a suitable tool.

The joint of FIGURE 4 comprises resilient means which consists of a helical compression spring 40 of frusto-conical shape in abutment against shoulders 42 and 44 provided on inner and outer members 10 and 14 respectively. A boot 46 providing the tightness of the joint against dirt is located around spring 40.

The mounting of the joint of FIGURE 4 may be effected by insertion of the balls between the two members from the outside of joint as in the case of the joint of FIGURE 3, but it is also possible and even preferable to insert the balls from the inside of outer member 10.

The joints of FIGURES 3 and 4 are no-lash joints very convenient for use in steering columns for vehicles.

What I claim is:

1. A universal joint in which the torque is transmitted between an inner member and an outer member by balls located in rectilinear grooves extending axially in the internal wall of the outer member, said inner member comprising a part spherical convex surface cooperating with a portion of internal surface of the outer member which is substantially cylindrical and further comprising a cylindrical concave surface having its axis perpendicular to the axis of the joint in aligned condition which cooperates with two balls diametrally opposed and located in grooves extending symmetrically with respect to the axial plane of symmetry of said portion of internal surface.

2. A universal joint according to claim 1, wherein the diameter of each of the balls is substantially equal to the radius of the spherical surface of the inner member.

3. A universal joint according to claim 1, wherein the portion of substantially cylindrical surface of said outer member with which cooperates the spherical surface of the inner member is slightly frusto-conical and tapered toward the exterior, whereby the inner member being urged toward the interior of the outer member radial play is eliminated between the two members.

4. A universal joint according to claim 1 wherein the portion of substantially cylindrical surface of said outer member with which cooperates the spherical surface of the inner member is slightly frusto-conical or spherical and tapered toward the interior, whereby the inner member being urged toward the exterior of the outer member radial play is eliminated between the two members.

5. A universal joint according to claim 4, wherein resilient means are provided between the outer member and the inner member to urge the latter in engagement against the tapered surface portion of said outer member.

6. A universal joint according to claim 5, wherein said resilient means are located in said outer member.

7. A universal joint according to claim 6, wherein said resilient means consist of Belleville washers or the like located between radial projections on the inner surface of the outer member and said inner member.

8. A universal joint according to claim 5, wherein said resilient means are located outside of the joint and consist of a helical compression spring in abutment against shoulders provided on said inner and outer members respectively.

References Cited

UNITED STATES PATENTS 1,066,425    7/1913    Betts _____ 64—7

HALL C. COE, Primary Examiner

U.S. Cl. X.R.

64—8